(12) United States Patent
Lee et al.

(10) Patent No.: US 11,929,843 B1
(45) Date of Patent: Mar. 12, 2024

(54) DEVICE AND METHOD FOR RETRIEVING PREVIOUS CHAT HISTORY OF CHAT ROOM

(71) Applicant: SAMSUNG SDS CO., LTD., Seoul (KR)

(72) Inventors: Seungwon Lee, Seoul (KR); Haneol Lee, Seoul (KR); Kyungsun Kang, Seoul (KR); Yongkook Park, Seoul (KR); Hwanyeol Choi, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 18/350,106

(22) Filed: Jul. 11, 2023

(30) Foreign Application Priority Data

Sep. 15, 2022 (KR) .......................... 10-2022-0116285

(51) Int. Cl.
*H04L 12/18* (2006.01)
(52) U.S. Cl.
CPC ................................ *H04L 12/1831* (2013.01)
(58) Field of Classification Search
None
See application file for complete search history.

(56) References Cited

U.S. PATENT DOCUMENTS

| | | | | |
|---|---|---|---|---|
| 9,456,012 | B2* | 9/2016 | Cohen | G06F 40/166 |
| 11,822,785 | B2* | 11/2023 | Kamath | G06F 3/0482 |
| 2006/0053195 | A1* | 3/2006 | Schneider | H04L 67/55 |
| | | | | 709/204 |
| 2013/0262574 | A1* | 10/2013 | Cohen | H04L 12/1818 |
| | | | | 709/204 |
| 2016/0149839 | A1* | 5/2016 | Yi | H04L 51/04 |
| | | | | 709/206 |
| 2018/0152411 | A1* | 5/2018 | Lee | H04L 51/02 |
| 2020/0044998 | A1* | 2/2020 | Jeon | H04L 51/046 |
| 2023/0360349 | A1* | 11/2023 | Fieldman | G06F 3/017 |

FOREIGN PATENT DOCUMENTS

KR 10-2009-0002258 A 1/2009

* cited by examiner

*Primary Examiner* — Quang N Nguyen
(74) *Attorney, Agent, or Firm* — NSIP Law

(57) ABSTRACT

A device for retrieving previous chat history from a chat room includes a control module configured to generate a chat history retrieval request, a transmitting/receiving module configured to transmit the generated chat history retrieval request to a server, and to receive, from the server, a previous chat history, and an input/output module configured to display the received previous chat history in a chat window. The invitation message at least includes an ID of the first user, an ID of the second user, an ID of the chat room, a transmission time of the invitation message, and a previous message code. The previous message code is unit time for limiting the retrieval start point.

18 Claims, 7 Drawing Sheets

DEVICE AND METHOD FOR RETRIEVING
PREVIOUS CHAT HISTORY OF CHAT
ROOM

CROSS-REFERENCE TO RELATED APPLICATIONS

This application claims benefit under 35 USC § 119(a) of priority to Korean Patent Application No. 10-2022-0116285 filed on Sep. 15, 2022 in the Korean Intellectual Property Office, the disclosure of which is incorporated herein by reference in its entirety.

BACKGROUND

1. Field

The present disclosure relates to a device and method for retrieving previous chat history from a chat room.

2. Description of Related Art

A messenger program is a program allowing the transmission and reception of simple messages over a network. That is, once a user transmitting a message and at least one user receiving the message are determined, the message may be transmitted and received in a chat room including the determined participants.

An existing user participating in the above-described chat room may invite a new user to participate in the chat room, and the invited user may transmit and receive messages with the existing user in the chat room.

However, in the case of an existing chat room, an invited new user may not be able to see chat history prior to the point in time at which the new user entered the chat room. Moreover, in order to share previous chat history, it is inconvenient to copy and paste the previous chat history or rewrite the previous chat history.

SUMMARY

An aspect of the present disclosure provides a device for retrieving previous chat history from a chat room, the device capable of allowing a user invited to participate in the chat room to retrieve the previous chat history of the chat room, and limiting a start point in time at which the previous chat history is retrievable.

According to an aspect of the present disclosure, a device for retrieving chat history from a chat room includes: one or more processors; memory storing instructions configured to cause the one or more processors to: generate a chat history retrieval request, the chat history retrieval request including an ID of a second user to which a chat-invitation message from a first user participating in the chat room is directed, and an ID of the chat room; transmit the chat history retrieval request to a server, and receive, from the server, the chat history, the chat history including previous chats of the chat room, wherein each previous chat includes a historical chat transmission time of the chat, a user ID, and a chat content, and wherein the previous chats are included in the chat history based on having respective historical chat transmission times that are after a retrieval start point, the retrieval start point being a time controlling which previous chats of the chat room the second user is able to retrieve based on the historical chat transmission times of the previous chats; and cause a second device operated by the second user to display the received chat history in a chat window of the second device, wherein the chat-invitation message includes an ID of the first user, an ID of the second user, an ID of the chat room, a transmission time of the chat-invitation message, and a previous-message time-amount according to which the retrieval start point is to be determined by default.

The retrieval start point may be a time point obtained by subtracting the time amount from the transmission time of the chat-invitation message.

The previous-message time-amount may be zero and the retrieval start point may be set to be the transmission time of the chat-invitation message.

The retrieval start point may be earlier than a point in time when the chat room was initially generated, and the chat room generation point in time may be set as the retrieval start point.

The chat-invitation message may further include an ID of a third user, wherein the previous-message time-amount may be associated with the ID of the second user, wherein the invitation message may further include a second previous-message time-amount associated with the ID of the third user, and wherein the previous-message time-amount is more or less than the second previous-message time-amount.

The instructions may be further configured to cause the one or more processors to: receive, from the server, a second chat history, the second chat history including previous chats of the chat room, wherein each previous chat of the second chat history includes a historical chat transmission time of the chat, a user ID, and a chat content, and wherein the previous chats are included in the second chat history based on having respective historical chat transmission times that are after a second retrieval start point that differs from the retrieval start point, the second retrieval start point being a time controlling which previous chats of the chat room the third user is able to retrieve based on the historical chat transmission times of the previous chats; and cause a third device operated by the third user to display the received second chat history in a chat window of the third device, wherein the chat-invitation message further includes an ID of the third user, and wherein the second previous-message time-amount is a time amount according to which the second retrieval start point is to be determined by default.

In another general aspect, a method for retrieving a chat history of a chat room includes: generating a chat history retrieval request, the chat history retrieval request including an ID of a second user to whom an invitation message from a first user participating in the chat room is directed, and an ID of the chat room; transmitting the chat history retrieval request to a server, and receiving, from the server, the chat history, the chat history including chats selected from among a history of chats of the chat room based on having a respective historical chat transmission time within a chat history retrieval start point, wherein each of the chats includes a respective user ID, chat content, and historical chat transmission time, wherein the chat history retrieval start point is a time within which the second user is able to retrieve chats from the history of chats of the chat room; and enabling a device operated by the second user to display the previous chat history in a chat window; wherein the invitation message includes an ID of the first user, an ID of the second user, an ID of the chat room, a transmission time of the invitation message, and a previous-message time-amount, and wherein the previous-message time-amount is a default basis for setting the retrieval start point.

The retrieval start point may be a time obtained by subtracting the previous-message time-amount from the transmission time of the invitation message.

The previous-message time-amount may be zero and the retrieval start point may be set to be the transmission time of the invitation message.

The retrieval start point may be earlier than a chat room generation point in time, and the chat room generation point in time may be set as the retrieval start point.

Previous-message time-amounts may be individually settable for respective user IDs in the invitation message.

In another general aspect, a method includes: managing, by a server, a chat room, the managing including storing a chat room ID of the chat room, a first user ID of a user associated with the chat room, a second user ID of a user associated with the chat room, the managing further including recording, into a main chat history, historical chat messages of the chat room sent by the first and second users, each historical chat message in the main chat history including an original message time corresponding to when the historical chat message was sent to the chat room; receiving, by the server, after the historical chat messages of the chat room have been recorded into the main chat history, a chat invitation message, the chat invitation message including a third user ID of a third user being invited to the chat room and including a time limit; based on the chat invitation message and the time limit thereof, generating a chat sub-history by including in the chat sub-history those historical chat messages in the main chat history determined to have original message times within the time limit such that historical chat messages with original message times outside the time limit are not included in the chat sub-history; and sending the chat sub-history to a user device associated with the third user ID.

The server may store a retrieval time point based on the time limit, wherein the server may receive a chat-history request message from the user device associated with the third user ID, and in response to the chat-history request message the server may send the chat sub-history to the user device associated with the third user ID.

The chat-history request message may be generated by the user device associated with the third user ID based on the user device receiving the chat invitation message or an invitation message based thereon.

The chat invitation message may further include a fourth user ID of a fourth user being invited to the chat room and may include a second time limit associated with the fourth user ID that is different than the time limit.

The method may further include: based on the chat invitation message and the second time limit thereof, generating a second chat sub-history by including in the second chat sub-history those historical chat messages in the main chat history determined to have original message times within the second time limit such that historical chat messages with original message times outside the second time limit are not included in the chat sub-history; and sending the second chat sub-history to a user device associated with the fourth user ID.

The method may further include: displaying, by the user device associated with the third user ID, a first chat user interface configured to enable messaging to and from the chat room, and displaying the chat sub-history in the first chat user interface; and displaying, by the user device associated with the fourth user ID, a second chat user interface configured to enable messaging to and from the chat room, and displaying the second chat sub-history in the second chat user interface.

The second chat sub-history may include historical chat messages that are not included in the chat sub-history.

BRIEF DESCRIPTION OF THE DRAWINGS

The above and other aspects, features, and advantages of the present disclosure will be more clearly understood from the following detailed description, taken in conjunction with the accompanying drawings, in which.

Figure 1:
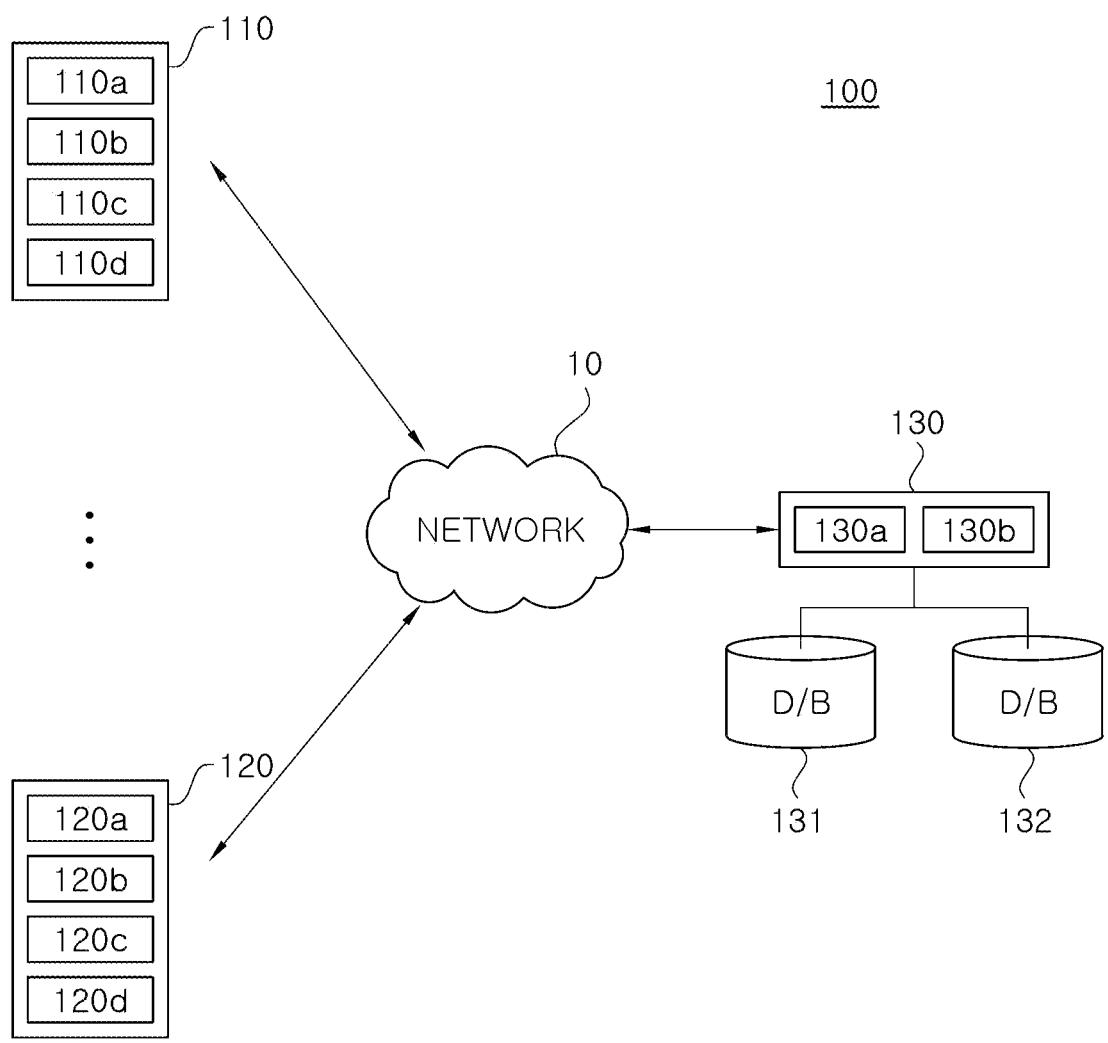
FIG. 1 is a configuration diagram illustrating a system including a device for retrieving previous chat history from a chat room according to an example embodiment of the present disclosure.

Other features and aspects will be apparent from the following detailed description, the drawings, and the claims.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, example embodiments of the present disclosure will be described with reference to the accompanying drawings. The present disclosure may, however, be exemplified in many different forms and should not be construed as being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

FIG. 1 is a configuration diagram illustrating a system including a device for retrieving previous chat history from a chat room according to an example embodiment of the present disclosure. A system 100 may include a device 110 of a first user who transmits an invitation message, a device 120 of a second user who has received the invitation message and retrieves a previous chat history, and a server 130 having a plurality of databases 131 and 132. The device 110 of the first user, the device 120 of the second user, and the server 130 may be interconnected via a network 10. FIG. 1 illustrates only two devices 110 and 120 for ease, but it should be noted that the number of devices is not limited.

In the present disclosure, a chat room may refer to a virtual space in which users are able to transmit and receive messages, and may be based on a concept including both a personal chat room in which only two users participate and a group chat room in which three or more people participate.

When the chat room is a personal chat room, two users may be present. When the chat room is a group chat room, three or more users may be present. The device 110 of the first user illustrated in FIG. 1 may be a device used by one user (hereinafter referred to as "first user") among the users participating in an existing chat room.

Conversely, the device 120 of the second user illustrated in FIG. 1 may be a device used by a user (hereinafter referred to as a "second user") who has not participated in the above-described existing chat room and is invited by the first user. The second user may be one or two or more.

Hereinafter, operations of the device 110 of the first user, the device 120 of the second user, and the server 130 will be described with reference to FIG. 1.

As illustrated in FIG. 1, the device 110 of the first user may be a device used by the first user participating in the chat room, and may include an input/output module 110*a*, a control module 110*b*, a transmitting/receiving module 110*c*, and a memory 110*d*.

Specifically, the input/output module 110*a* may be a module for receiving a previous message code from the first user or displaying a chat window. The input/output module 110*a* may include, for example, a keyboard, a mouse, a touch panel, a display panel, and the like.

The previous message code described above may be unit time (for example, 0 hour ago, 1 hour ago, 6 hours ago, and 48 hours ago) for limiting a retrieval start point at which the second user is able to perform retrieval, based on an invitation point in time (that is, a transmission time of an invitation message described below) of a past chat history of the chat room.

Figure 2:
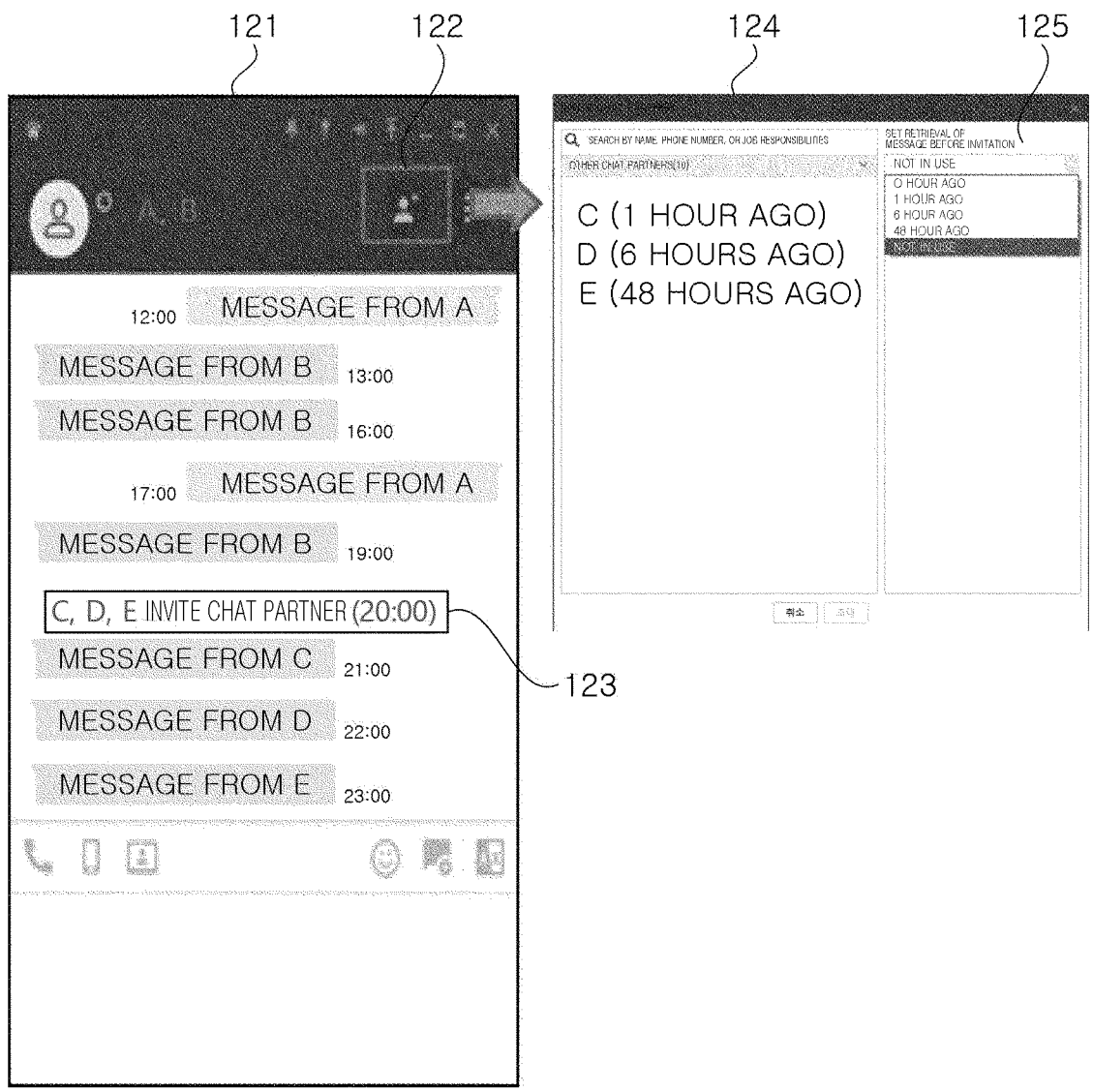
FIG. 2, an example screen for inviting a plurality of second users C, D, and E by a first user A among two users A and B participating in an existing chat room, is a diagram illustrating the above-described previous message code according to an example embodiment of the present disclosure.

FIG. 2, an exemplary screen for inviting a plurality of second users C, D, and E by a first user A among two users A and B participating in an existing chat room, is a diagram illustrating the above-described previous message code according to an example embodiment of the present disclosure. FIG. 2 illustrates a plurality of second users C, D, and E, but the number of users may also be one.

In order to assist in understanding of the present disclosure, it is illustrated that two users (A and B) are already participating in a chat room, and a chat window 121 displays a message from A transmitted at 12:00, a message from B transmitted at 13:00, a message from B transmitted at 16:00, a message from A transmitted at 17:00, a message from B transmitted at 19:00, a message from C transmitted at 21:00, a message from D transmitted at 22:00, and a message from D transmitted at 23:00. In addition, it is assumed that an invitation point in time 123 (that is, a transmission time of an invitation message) at which a first user A invites other second users C, D, and E is 20:00.

When a friend invitation button 122 is pressed in the chat window 121, a chat partner invitation window 124 may be opened, and the first user A may add the second users C, D, and E to be invited. In this case, via a previous message code window 125, a previous message code may be input for each user. Specifically, as illustrated in FIG. 2, 1 hour ago may be input for user C, 6 hours ago may be input for user D, and 48 hours ago may be input for user E. That is, when there are a plurality of second users, the previous message code may be set for each of the plurality of second users.

The control module 110b may generate an invitation message for inviting a new second user to the chat room, and may transmit the generated invitation message to the server 130 via the transmitting/receiving module 110c.

The above-described invitation message may include an ID of the first user, an ID of the second user, an ID of the chat room, and a transmission time of the invitation message, and may further include a previous message code (e.g., a code indicating a message-history time range, e.g., X hours, for a specific invitee).

The transmitting/receiving module 110c of the device 110 of the first user may transmit the invitation message to the server 130 via the network 10.

A messenger program or application for the above-described chat room may be loaded and executed in the memory 110d.

The server 130 may include a transmitting/receiving module 130a and a control module 130b.

Specifically, the transmitting/receiving module 130a may receive an invitation message from the device 110 of the first user via the network 10, and may transmit the received invitation message to the control module 130b and the device 120 of the second user. Alternatively, the transmitting/receiving module 130a may receive a chat history retrieval request from the device 120 of the second user via the network 10, and may transmit the received chat history retrieval request to the control module 130b. The chat history retrieval request described above may include the ID of the chat room and the ID of the second user. Alternatively, the transmitting/receiving module 130a may transmit a previous chat history to the device 120 of the second user.

The control module 130b may obtain a retrieval start point in response to a previous message code of the invitation message.

Specifically, the above-described retrieval start point may be a time obtained by subtracting unit time of the previous message code from the transmission time of the invitation message. However, in this case, when the retrieval start point obtained is before a chat room generation point in time, the chat room generation point in time may be set as a retrieval start point so as to prevent errors. When the previous message code is 0, a retrieval point in time may be the transmission time of the invitation message.

In addition, the control module 130b may store, in a first database 131, the retrieval start point and the ID of the second user.

The above-described first database 131 may be a module storing chat room information including, for each chat room ID, a type of chat room, the type indicating whether the chat room is a personal chat room or a group chat room, a chat room generation point in time, an ID of a participating user, a device ID of the participating user, and a retrieval start point (which may be specific to a user ID).

In addition, the control module 130b may extract, based on the ID of the second user and the ID of the chat room included in the chat history retrieval request, a retrieval start point of the second user from the first database 131, and may extract, from the second database 132, a previous chat history in which a transmission time of a chat is after the extracted retrieval start point. The extracted previous chat history may be transmitted to the device 120 of the second user via the transmitting/receiving module.

The above-described second database 132 may be a module storing a past chat history including, for each chat room ID, a transmission time of a chat, a user ID, and a chat content.

When the chat room is a personal chat room, the control module 130b may transmit, to the device 110 of the first user and the server 130, a chat room type change notification informing that a type of the chat room has been changed. In this case, the device 110 of the first user may change and display the type of the chat room, and the server 130 may update the type of the chat room in the first database 131.

The device 120 of the second user may include an input/output module 120a, a control module 120b, a transmitting/receiving module 120c, and a memory 120d.

First, the input/output module 120a may be a module for receiving a message content (for example, text) from a second user and displaying an invitation message or a previous chat history via a chat window. The input/output module 120a may include, for example, a keyboard, a mouse, a touch panel, a display panel, and the like.

Figure 3A:
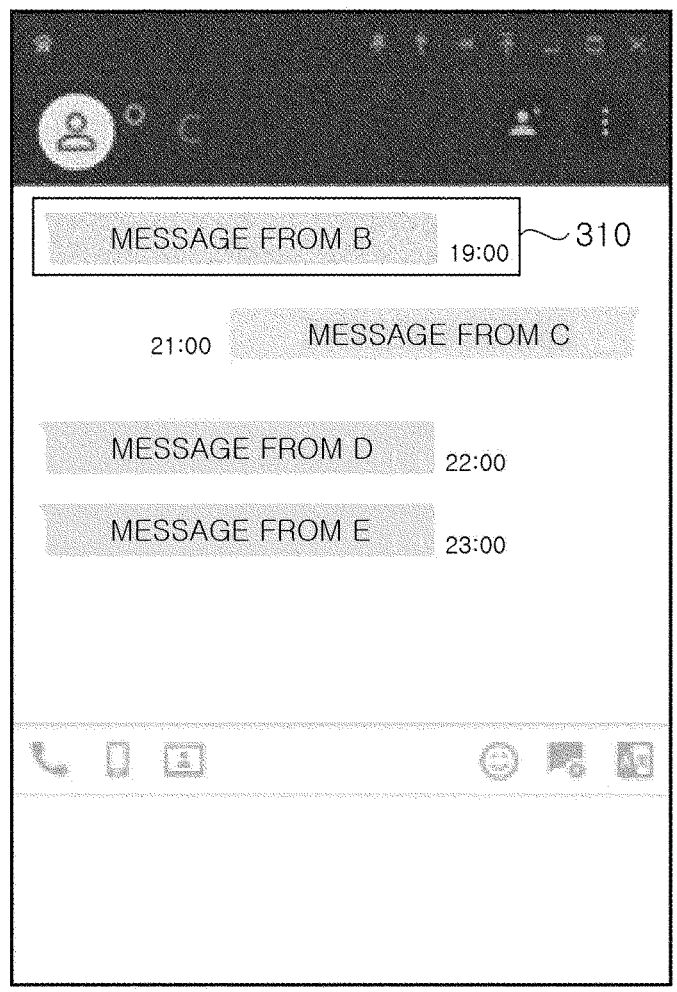
FIGS. 3A to 3C are diagrams illustrating a previous chat history displayed on a device of each of a plurality of second users C, D, and E in response to a previous message code.
Figure 3B:
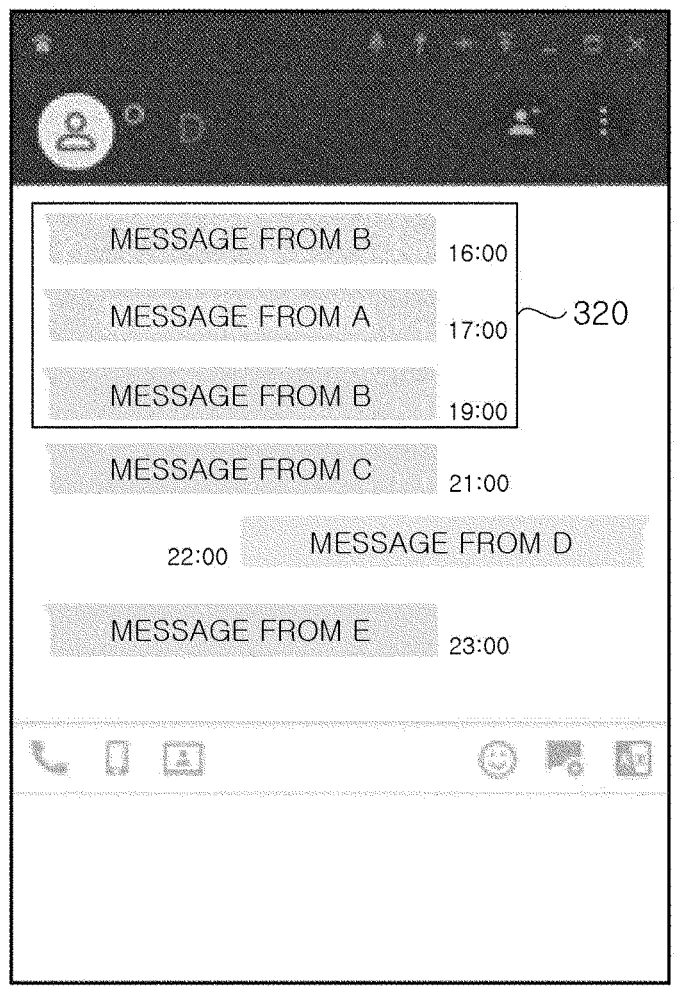
Figure 3C:
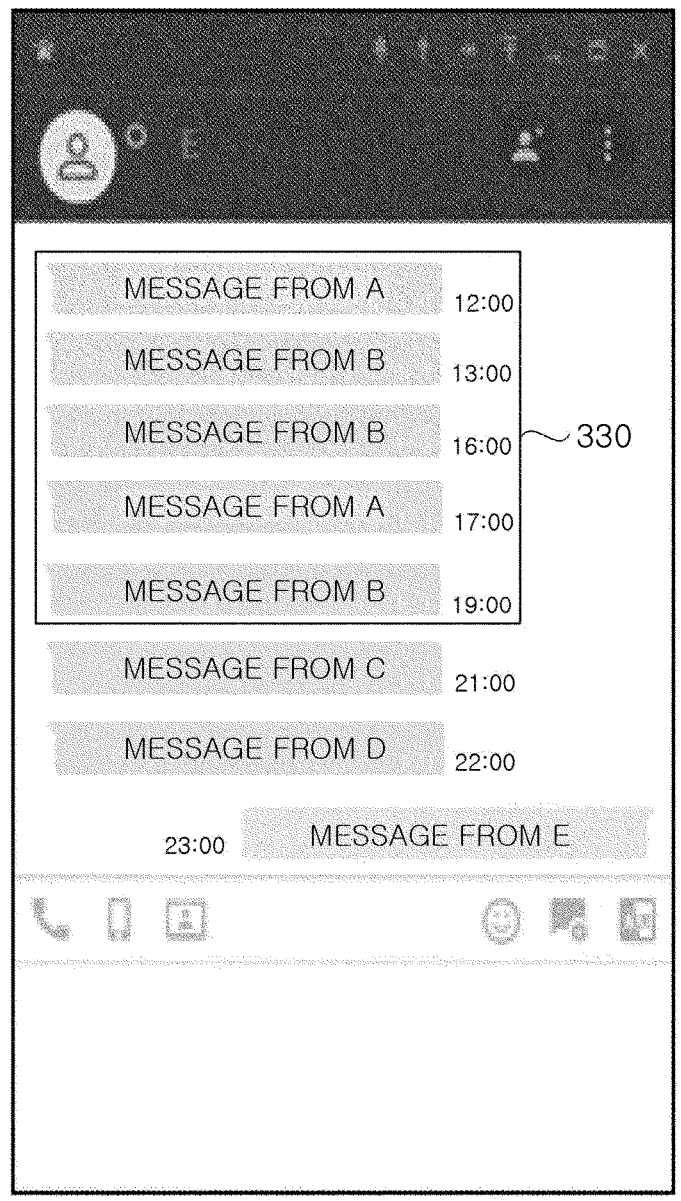

FIGS. 3A to 3C are diagrams illustrating a previous chat history displayed on a device of each of a plurality of second users C, D, and E in response to a previous message code.

In FIG. 2 described above, it is assumed that an invitation point in time 123 at which a first user A invites other second users C, D, and E is 20:00. A previous message code may be set to 1 hour ago for user C, 6 hours ago for user D, and 48 hours ago for user E.

FIG. 3A illustrates a previous chat history displayed on a device of a second user C. Due to the previous message code set to 1 hour ago for user C based on the invitation point in time of 20:00, a previous chat history 310 displayed on the device of the second user C may display a chat history from 1 hour before 20:00, that is, a message from B transmitted at 19:00. A message from C transmitted at 21:00, a message from D transmitted at 22:00, and a message from E transmitted at 23:00 may be obviously displayed since the transmission times of the messages are after a time at which the second user C participates in a chat room.

FIG. 3B illustrates a previous chat history displayed on a device of another second user D. Due to the previous message code set to 6 hours ago for user D based on the invitation point in time of 20:00, a previous chat history 320 displayed on the device of the second user D may display a chat history from 6 hours before 20:00, that is, a message from B transmitted at 16:00, a message from A transmitted at 17:00, and a message from B transmitted at 19:00. A message from C transmitted at 21:00, a message from D transmitted at 22:00, and a message from E transmitted at 23:00 may be obviously displayed since the transmission times of the messages are after a time at which the second user D participates in a chat room.

FIG. 3C illustrates a previous chat history displayed on a device of another second user E. Due to the previous message code set to 48 hours ago for user E based on the invitation point in time of 20:00, a previous chat history 330 displayed on the device of the second user E may display a message from A transmitted at 12:00, a message from B transmitted from 13:00, a message from B transmitted at 16:00, a message from A transmitted at 17:00, and a message from B transmitted at 19:00. A message from C transmitted at 21:00, a message from D transmitted at 22:00, and a message from E transmitted at 23:00 may be obviously displayed since the transmission times of the messages are after a time at which the second user E participates in a chat room.

The control module 130b may generate a chat history retrieval request. The generated chat history retrieval request may be transmitted to the server 130 via the transmitting/receiving module 120c.

The above-described chat history retrieval request, transmitted by a second user invited by a first user participating in a chat room, may include an ID of the second user and an ID of the chat room, as described above.

The transmitting/receiving module 120c may transmit the above-described chat history retrieval request to the server 130 or may receive an invitation message or a previous chat history from the server 130. The received invitation message or previous chat history may be displayed on a chat window via the input/output module 120a.

The invitation message may at least include an ID of a first user, an ID of a second user, an ID of a chat room, a transmission time of the invitation message, and a previous message code. The previous message code may be unit time for limiting the retrieval start point, as described above.

Finally, a messenger program or application for the above-described chat room may be loaded and executed in the memory 120d.

In the present disclosure, the devices 110 and 120 may include, for example, a smartphone, a mobile phone, a laptop computer, a digital broadcasting terminal, a personal digital assistant (PDA), a portable multimedia player (PMP), a tablet PC, and the like.

As described above, according to an example embodiment of the present disclosure, a second user, invited by a first user participating in a chat room, may transmit a chat history request to a server, and the server may transmit a previous chat history of the chat room to the second user, such that the second user may retrieve a chat history prior to an invitation point in time.

In particular, according to an example embodiment of the present disclosure, an invitation message, including a previous message code for designating a point in time at which the second user is able to perform retrieval, may be transmitted, thereby limiting a retrievable point in time.

Figure 4:
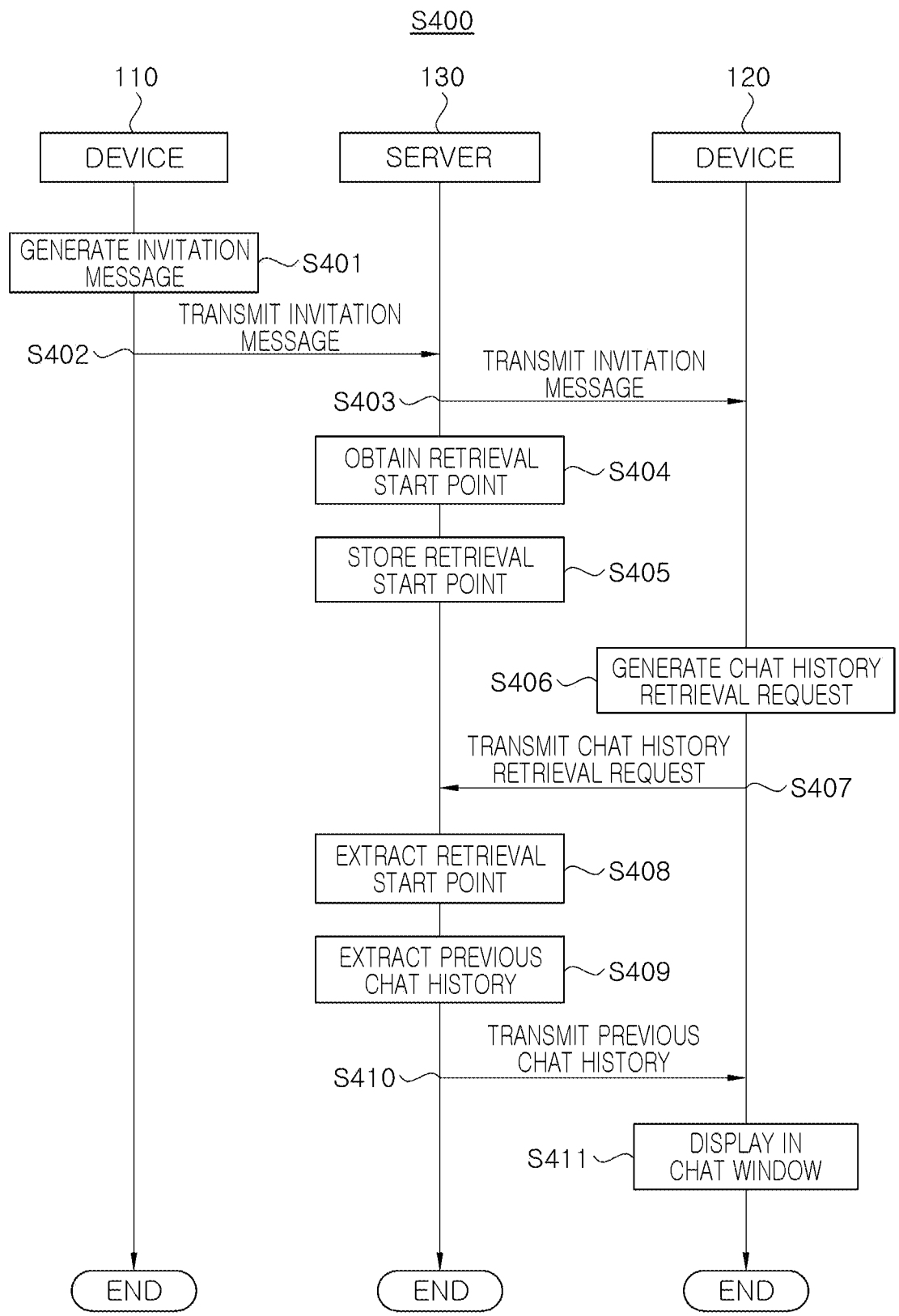
FIG. 4 is a flowchart illustrating a method for retrieving previous chat history from a chat room according to an example embodiment of the present disclosure.

FIG. 4 is a flowchart illustrating a method for retrieving previous chat history from a chat room according to an example embodiment of the present disclosure.

Hereinafter, a flowchart (S4000) including a method for retrieving previous chat history from a chat room according to an embodiment of the present disclosure will be described with reference to FIGS. 1 to 4. However, a description overlapping with those of FIGS. 1 to 3 will be omitted for simplicity of the disclosure.

First, referring to FIGS. 1 to 4, the device 110 of the first user may generate an invitation message for inviting a new second user to a chat room (S401), and may transmit the generated invitation message to the server 130 (S402).

The invitation message described above may include an ID of the first user, an ID of the second user, an ID of the chat room, a transmission time of the invitation message, and a previous message code. The previous message code may be unit time (timespan) for limiting a retrieval start point, as described above.

The server 130 may transmit the received invitation message to the device 120 of the second user (S403).

Subsequently, the server 130 may obtain the retrieval start point (S404).

Specifically, the retrieval start point may be a time obtained by subtracting unit time of the previous message code from the transmission time of the invitation message. However, in this case, when the retrieval start point obtained is before a chat room generation point in time, the chat room generation point in time may be set as a retrieval start point so as to prevent errors. When the previous message code is 0, a retrieval point in time may be the transmission time of the invitation message.

The server 130 may store the retrieval start point and the second user ID in the first database 131 (S405).

Thereafter, the device 120 of the second user may generate a chat history retrieval request (S406), and the generated chat history retrieval request may be transmitted to the server 130 (S407).

The above-described chat history retrieval request, transmitted by the second user invited by the first user participating in a chat room, may include the ID of the second user and the ID of the chat room, as described above.

Subsequently, the server 130 may extract, based on the ID of the second user and the ID of the chat room included in the chat history retrieval request, a retrieval start point of the second user from the first database 131 (S408), and may extract, from the second database 132, a previous chat history in which a transmission time of a chat is after the extracted retrieval start point (S409).

As described above, the above-described first database 131 may be a module storing chat room information including, for each chat room ID, a type of chat room, the type indicating whether the chat room is a personal chat room or a group chat room, a chat room generation point in time, an ID of a participating user, a device ID of the participating user, and a retrieval start point, and the above-described second database 132 may be a module storing a past chat history including, for each chat room ID, a transmission time of a chat (for multiple chats (chat messages)), a user ID, and a chat content.

Thereafter, the server 130 may transmit the extracted previous chat history to the device 120 of the second user (S410).

Finally, the device 120 of the second user may display the previous chat history via a chat window (S411).

As described above, according to an example embodiment of the present disclosure, a second user, invited by a first user participating in a chat room, may transmit a chat history request to a server, and the server may transmit a previous chat history of the chat room to the second user, such that the second user may retrieve a chat history prior to an invitation point in time (or joining time).

Figure 5:
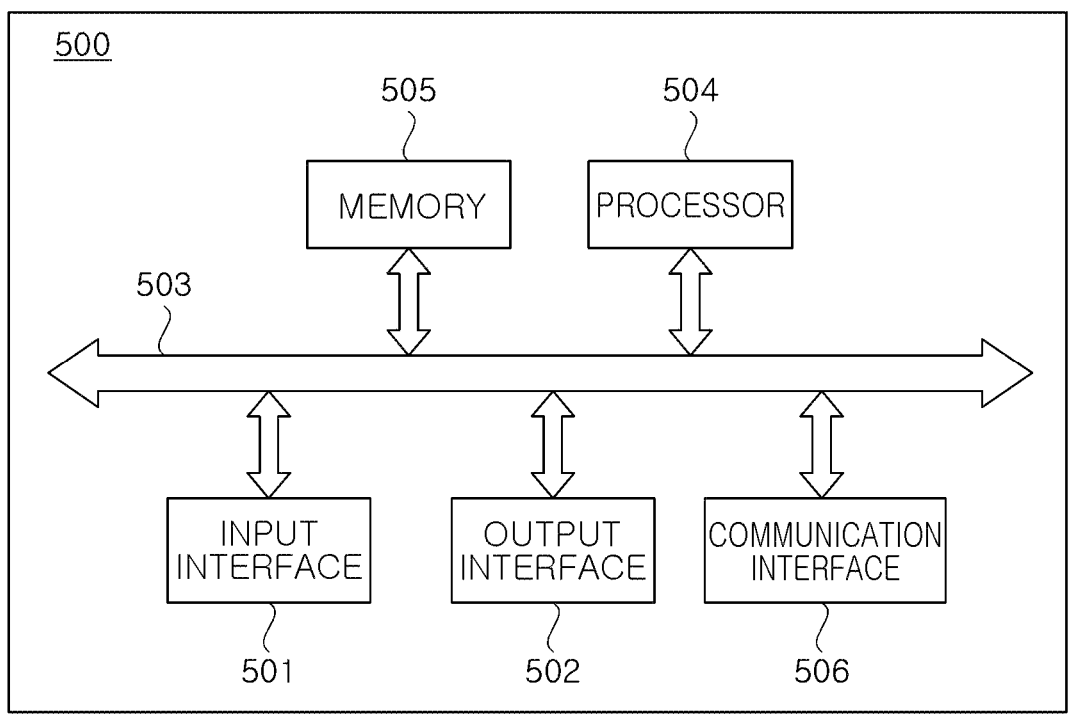
FIG. 5 is a block diagram illustrating a computer device capable of fully or partially implementing a device for retrieving a previous chat history according to an example embodiment of the present disclosure.

FIG. 5, a block diagram illustrating a computer device capable of fully or partially implementing a device for retrieving a previous chat history according to an example embodiment of the present disclosure, may be applied to the device 110 of the first user, the device 120 of the second user, and the server 130 illustrated in FIG. 1.

As illustrated in FIG. 5, a computer device 500 may include an input interface 501, an output interface 502, a processor 504, a memory 505, and a communication interface 506, and the input interface 501, the output interface 502, the processor 504, the memory 505, and the communication interface 506 may be interconnected via a system bus 503.

In an example embodiment of the present disclosure, the memory 505 may be used to store programs, instructions or codes, and the processor 504 may execute the programs, instructions or codes stored in the memory 505, may control the input interface 501 to receive signals, and may control the output interface 502 to transmit signals. The above-described memory 505 may include read-only memory and random access memory, and may provide instructions and data to the processor 504.

In an example embodiment of the present disclosure, the processor 504 may be a central processing unit (CPU), and may be understood as being another general-purpose processor, a digital signal processor (DSP), an application specific integrated circuit (ASIC), a field programmable gate array (FPGA) or another programmable logic device, an individual gate or transistor logic device, an individual hardware component, or the like. A general-purpose processor may be a microprocessor, or the processor may be any processor according to the related art or the like.

In an implementation, the method performed by respective devices 110, 120, 130, and 140 of FIG. 4 may be accomplished by an integrated logic circuit of hardware in the processor 404 or an instruction in the form of software. The method disclosed with respect to example embodiments of the present disclosure may be performed and completed by a hardware processor, or may be performed and completed by a combination of hardware in the processor and a software module. The software module may be disposed in a storage medium such as random access memory, flash memory, read-only memory, programmable read-only memory, or electrically erasable programmable memory, a register, or the like. The storage medium may be positioned in the memory 505. The processor 504 may read information in the memory 505, and may implement the above-described method in combination with hardware. In order to avoid redundancy, a detailed description will be omitted herein.

In the present disclosure, " . . . unit" may be implemented in various manners, for example, by a processor, program instructions executed by the processor, a software module, a microcode, a computer program product, a logic circuit, an application-specific integrated circuit, firmware, or the like.

While example embodiments have been illustrated and described above, it will be apparent to those skilled in the art that modifications and variations could be made without departing from the scope of the present disclosure as defined by the appended claims.

The computing apparatuses, the servers, the electronic devices, the processors, the memories, the displays, the information output system and hardware, the storage devices, and other apparatuses, devices, units, modules, and components described herein with respect to FIGS. 1-5 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD–ROMs, CD–Rs, CD+Rs, CD–RWs, CD+RWs, DVD–ROMs, DVD–Rs, DVD+Rs, DVD–RWs, DVD+RWs, DVD–RAMs, BD–ROMs, BD–Rs, BD–R LTHs, BD–Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A device for retrieving chat history from a chat room, the device comprising:
   one or more processors;
   memory storing instructions configured to cause the one or more processors to:
   generate a chat history retrieval request, the chat history retrieval request including an ID of a second user to which a chat-invitation message from a first user participating in the chat room is directed, and an ID of the chat room;
   transmit the chat history retrieval request to a server, and receive, from the server, the chat history, the chat history including previous chats of the chat room, wherein each previous chat includes a historical chat transmission time of the chat, a user ID, and a chat content, and wherein the previous chats are included in the chat history based on having respective historical chat transmission times that are after a retrieval start point, the retrieval start point being a time controlling which previous chats of the chat room the second user is able to retrieve based on the historical chat transmission times of the previous chats; and
   cause a second device operated by the second user to display the received chat history in a chat window of the second device;
   wherein the chat-invitation message includes an ID of the first user, an ID of the second user, an ID of the chat room, a transmission time of the chat-invitation message, and a previous-message time-amount according to which the retrieval start point is to be determined by default; and
   wherein the retrieval start point is a time point corresponding to a difference between the time amount and the transmission time of the chat-invitation message.

2. The device of claim 1, wherein the retrieval start point is a time point obtained by subtracting the time amount from the transmission time of the chat-invitation message.

3. The device of claim 2, wherein the previous-message time-amount is zero and the retrieval start point is set to be the transmission time of the chat-invitation message.

4. The device of claim 2, wherein, when the retrieval start point is earlier than a point in time when the chat room was initially generated, the chat room generation point in time is set as the retrieval start point.

5. The device of claim 2, wherein the chat-invitation message further includes an ID of a third user, wherein the previous-message time-amount is associated with the ID of the second user, wherein the invitation message further includes a second previous-message time-amount associated with the ID of the third user, and wherein the previous-message time-amount is more or less than the second previous-message time-amount.

6. The device of claim 5, wherein the instructions are further configured to cause the one or more processors to: receive, from the server, a second chat history, the second chat history including previous chats of the chat room, wherein each previous chat of the second chat history includes a historical chat transmission time of the chat, a user ID, and a chat content, and wherein the previous chats are included in the second chat history based on having respective historical chat transmission times that are after a second retrieval start point that differs from the retrieval start point, the second retrieval start point being a time controlling which previous chats of the chat room the third user is able to retrieve based on the historical chat transmission times of the previous chats; and cause a third device operated by the third user to display the received second chat history in a chat window of the third device, wherein the chat-invitation message further includes an ID of the third user, and wherein the second previous-message time-amount is a time amount according to which the second retrieval start point is to be determined by default.

7. A method for retrieving a chat history of a chat room, the method comprising:
   generating a chat history retrieval request, the chat history retrieval request including an ID of a second user to whom an invitation message from a first user participating in the chat room is directed, and an ID of the chat room;
   transmitting the chat history retrieval request to a server, and receiving, from the server, the chat history, the chat history including chats selected from among a history of chats of the chat room based on having a respective historical chat transmission time within a chat history retrieval start point, wherein each of the chats includes a respective user ID, chat content, and historical chat transmission time, wherein the chat history retrieval start point is a time within which the second user is able to retrieve chats from the history of chats of the chat room; and enabling a device operated by the second user to display the previous chat history in a chat window;

wherein the invitation message includes an ID of the first user, an ID of the second user, an ID of the chat room, a transmission time of the invitation message, and a previous-message time-amount, and wherein the previous-message time-amount is a default basis for setting the retrieval start point; and wherein the retrieval start point is a time point corresponding to a difference between the previous-message time-amount and the transmission time of the invitation message.

8. The method of claim 7, wherein the retrieval start point is a time obtained by subtracting the previous-message time-amount from the transmission time of the invitation message.

9. The method of claim 8, wherein the previous-message time-amount is zero and the retrieval start point is set to be the transmission time of the invitation message.

10. The method of claim 7, wherein, when the retrieval start point is earlier than a chat room generation point in time, the chat room generation point in time is set as the retrieval start point.

11. The method of claim 7, wherein, previous-message time-amounts are individually settable for respective user IDs in the invitation message.

12. A method comprising:

managing, by a server, a chat room, the managing including storing a chat room ID of the chat room, a first user ID of a user associated with the chat room, a second user ID of a user associated with the chat room, the managing further including recording, into a main chat history, historical chat messages of the chat room sent by the first and second users, each historical chat message in the main chat history including an original message time corresponding to when the historical chat message was sent to the chat room;

receiving, by the server, after the historical chat messages of the chat room have been recorded into the main chat history, a chat invitation message, the chat invitation message including a third user ID of a third user being invited to the chat room and including a time limit;

based on the chat invitation message and the time limit thereof, generating a chat sub-history by including in the chat sub-history those historical chat messages in the main chat history determined to have original message times within the time limit such that historical chat messages with original message times outside the time limit are not included in the chat sub-history; and sending the chat sub-history to a user device associated with the third user ID.

13. The method of claim 12, wherein the server stores a retrieval time point based on the time limit, wherein the server receives a chat-history request message from the user device associated with the third user ID, and in response to the chat-history request message the server sends the chat sub-history to the user device associated with the third user ID.

14. The method of claim 12, wherein the chat-history request message is generated by the user device associated with the third user ID based on the user device receiving the chat invitation message or an invitation message based thereon.

15. The method of claim 12, wherein the chat invitation message further includes a fourth user ID of a fourth user being invited to the chat room and includes a second time limit associated with the fourth user ID that is different than the time limit.

16. The method of claim 15, further comprising: based on the chat invitation message and the second time limit thereof, generating a second chat sub-history by including in the second chat sub-history those historical chat messages in the main chat history determined to have original message times within the second time limit such that historical chat messages with original message times outside the second time limit are not included in the chat sub-history; and sending the second chat sub-history to a user device associated with the fourth user ID.

17. The method of claim 16, further comprising: displaying, by the user device associated with the third user ID, a first chat user interface configured to enable messaging to and from the chat room, and displaying the chat sub-history in the first chat user interface; and displaying, by the user device associated with the fourth user ID, a second chat user interface configured to enable messaging to and from the chat room, and displaying the second chat sub-history in the second chat user interface.

18. The method of claim 16, wherein the second chat sub-history includes historical chat messages that are not included in the chat sub-history.

* * * * *